US 8,971,961 B2

(12) United States Patent
Bishop et al.

(10) Patent No.: US 8,971,961 B2
(45) Date of Patent: Mar. 3, 2015

(54) WIRELESS DEVICE, METHOD OF OPERATING AND PROCESSING SYSTEM

(75) Inventors: Andrew Bishop, Guildford (GB); Alexander Graham Charles, Fleet (GB); Stuart Ian Geary, Fleet (GB)

(73) Assignee: Broadcom Corporation, Irvine, CA (US)

( * ) Notice: Subject to any disclaimer, the term of this patent is extended or adjusted under 35 U.S.C. 154(b) by 654 days.

(21) Appl. No.: 13/229,015

(22) Filed: Sep. 9, 2011

(65) Prior Publication Data

US 2013/0065644 A1    Mar. 14, 2013

(51) Int. Cl.
*H04W 88/02* (2009.01)
*H04W 8/18* (2009.01)

(52) U.S. Cl.
CPC .............. *H04W 8/183* (2013.01); *H04W 88/02* (2013.01)
USPC ....................................... 455/558; 455/435.2

(58) Field of Classification Search
USPC .......................... 455/422.1, 435.1, 435.2, 558
See application file for complete search history.

(56) References Cited

U.S. PATENT DOCUMENTS

| 2009/0156257 A1 | 6/2009 | Shi |
| 2009/0312020 A1 * | 12/2009 | Lee ............................ 455/435.2 |
| 2011/0117909 A1 | 5/2011 | Cao et al. |

FOREIGN PATENT DOCUMENTS

| EP | 2 352 353 A1 | 8/2011 |
| WO | WO 2005/017693 A2 | 2/2005 |

OTHER PUBLICATIONS

Combined Search and Examiner Report for United Kingdom Application No. GB1115614.8 dated Jan. 16, 2012.
International Search Report for Application No. PCT/IB2012/054615 dated Jan. 21, 2013.

* cited by examiner

*Primary Examiner* — Myron K Wyche
(74) *Attorney, Agent, or Firm* — Oblon, McClelland, Maier & Neustadt, L.L.P.

(57) ABSTRACT

A wireless device has a first SIM and a second SIM. The first SIM and the second SIM share a common radio system. A processing system determines whether to allocate use of the radio system to the second SIM for a time period that occurs when the first SIM is in an active connected mode using the common radio system in order to be able to at least one of transmit data and receive data. The processing system allocates or denies use of the radio system to the second SIM accordingly.

20 Claims, 4 Drawing Sheets

WIRELESS DEVICE, METHOD OF OPERATING AND PROCESSING SYSTEM

TECHNICAL FIELD

The present invention relates to a wireless device, a method of operating a wireless device and a processing system for a wireless device.

BACKGROUND

"Wireless devices" include in general any device capable of connecting wirelessly to a network, and includes in particular mobile devices including mobile or cell phones (including so-called "smart phones"), personal digital assistants, pagers, tablet and laptop computers, content-consumption or generation devices (for music and/or video for example), data cards, USB dongles, etc., as well as fixed or more static devices, such as personal computers, game consoles and other generally static entertainment devices, various other domestic and non-domestic machines and devices, etc. The term "user equipment" is often used to refer to wireless devices in general, and particularly mobile wireless devices.

A multi-SIM (subscriber identity module) wireless device, including particularly mobile devices such as mobile phones (including so-called "smart phones"), personal digital assistants, tablet and laptop computers, etc., can hold two or more SIM cards. Currently, such devices can typically hold two SIM cards, though phones that can hold three SIM cards are now available and it is likely that phones and other wireless devices that can hold more SIM cards will become available. For simplicity and brevity, reference will often be made in this specification to a dual-SIM device, which can operate with two networks and/or tariff arrangements, etc., but it will be understood that much of what is described herein can be applied to a multi SIM wireless device having in principle any number of SIMs for operating with a corresponding number of networks and/or tariff arrangements, etc. It is mentioned here that there are proposals to replace SIM (subscriber identity module) cards with SIM functionality provided by software in the device. Reference will be made in this specification generally to "SIM" to mean that part of a device that provides for the subscriber identity module functionality whether provided by a physical card, software elsewhere in the device, or any other suitable arrangement.

Dual-SIM operation allows the use of two services without the need to carry two devices at the same time. For example, the same handset can be used for business and private use with separate numbers and bills. As another example, the same handset can be used for travel, with one SIM being for use in the home country and the other SIM being for the country visited. As another example, both SIMs may be used with the same network operator, for example to achieve a higher total bandwidth for data connections. As yet another example, the device may contain both cellular and non-cellular radios which are used for voice and data communication respectively using the different SIMs. In any event, using multiple SIMs allows the user to take advantage of different pricing plans for calls and text messages to certain destinations as well as mobile data usage, and/or to keep personal and business use separate for example, and/or to achieve higher bandwidth, and/or to obtain coverage across different networks using a single handset. With this multiple SIM functionality, the SIMs can in general be from any network operator. The embodiments described herein are particularly concerned with mobile wireless devices that have two (or more) SIMs that share a radio system. These will typically be referred to herein as "dual-SIM, single radio devices" though it will be understood that this is to be taken to include any device that has plural SIMs where at least two of the SIMs share a radio system. The term "radio system" or just "radio" is typically used in this specification to refer to one or more of the radio front end, antenna(s), and relevant processing circuitry and software required for transmission/reception in a wireless device, unless the context requires otherwise.

Dual-SIM, single radio devices can provide a functionality referred to as "dual-SIM dual-standby", which means that in standby (or idle mode) either SIM is able to originate or terminate a connection (for example a call or data connection for email, texts, etc.). In particular, when both SIMs are in idle mode, pages can be received because these occur infrequently so it is possible for the two SIMs to use the radio on a time-shared basis. However, as soon as one SIM enters an active connected mode, it is given control of the radio and the other SIM is not able to transmit or receive any data (at least in the case of some radio access technologies). As a particular example, this means that the other SIM cannot receive indications of incoming calls, which is often not acceptable to users. This is particularly so if for example the one SIM is being used by an application, such as an email client, that has an ongoing packet data connection which could be ongoing for many hours. In such a case, the user may not even be aware of the ongoing packet data connection and thus not even know that the wireless device is for example unable to receive or even be notified of an incoming voice call. It is likely that a voice call on the other SIM would be more important to the user than the ongoing packet data connection for receiving email.

SUMMARY

According to a first aspect of the present invention, there is provided a method of operating a wireless device having at least a first SIM and a second SIM which share a common radio system, the method comprising: a first SIM of a wireless device being in an active connected mode using a common radio system of the wireless device in order to be able to at least one of transmit data and receive data; determining whether to allocate use of the radio system to a second SIM of the wireless device for a time period; and allocating or denying use of the radio system to the second SIM accordingly.

This allows the second SIM to have access to the shared radio system even if the first SIM has been allocated use of the shared radio system, because for example the first SIM is involved in an ongoing call, such as an ongoing packet data connection, as used for example when sending or receiving an email, or a circuit switched call. In an ongoing packet data connection, the first SIM may have periods when it is in active mode, which may be referred to as an active connected mode or active packet data transfer mode, or in idle mode. The term "active mode" or "active connected mode" may also be used to describe when a SIM is in a circuit switched (CS) call or when a SIM has short periods of inactivity but otherwise not in an idle state. As discussed further below, in various embodiments, decisions can be made as to whether in fact to permit the second SIM to have access to the shared radio system, and for example to allocate existing time gaps for it to do so or create new time gaps for it to do so.

In an embodiment, the determining comprises determining whether the time period corresponds to a time when the first SIM is or is not scheduled to use the radio system to transmit or receive a signal, and allocating use of the radio system to the second SIM if the first SIM is not scheduled to use the radio system to transmit or receive a signal during the time period. This is of particular advantage in cases where there is already an existing time gap when there is no activity on the first SIM. This occurs in for example DRX/eDRX ((Enhanced) Discontinuous Reception).

In an embodiment, the determining comprises determining whether the time period corresponds to a time when the first SIM is or is not scheduled to use the radio system to transmit or receive a signal, and allocating use of the radio system to the second SIM if the first SIM is scheduled to use the radio system to transmit or receive a signal during the time period but use of the radio system by the second SIM is determined to be a higher priority than use of the radio system by the first SIM. This is of particular advantage in cases where for example there is an existing gap in active packet data transfer to the first SIM during an ongoing packet data transfer, because for example the radio system is intended to be used for measurements for the first SIM at that time, such as in Compressed Mode (CM) or FACH (forward access control channel) measurements occasions (MO). In that case, use of the radio system by the second SIM may take priority over such measurements for the first SIM.

In an embodiment, the determining comprises determining whether the time period corresponds to a time when the first SIM is or is not scheduled to use the radio system to transmit or receive data, and interrupting use of the radio system by the first SIM to allow the second SIM to use the radio system to transmit or receive a signal during the time period. In this example, a "new" time gap may be scheduled for use by the second SIM, even if for example that involves interrupting an active packet data transfer to or from the first SIM or a circuit switched (CS) connection, such as a voice call.

In an embodiment, said time period corresponds to a scheduled time of the paging reception by the second SIM. In an embodiment, the second SIM is allocated use of the common radio system and receives a paging indicator during said time period, the second SIM continuing to use the common radio system if the paging indicator is positive, and the first SIM resuming use of the common radio system if the paging indicator is negative. These embodiments allow the second SIM to be notified of an incoming call say by receiving a positive paging indicator, and to minimise use of the radio system by the second SIM respectively.

In an embodiment, the second SIM requests use of the common radio system for the time period. As discussed further below, this includes the case when a processor associated with the second SIM effectively sends a request for use of the common radio system.

According to a second aspect of the present invention, there is provided a wireless device, the wireless device comprising: a common radio system arranged to be shared by a first SIM and a second SIM of the device in use; and at least one processor; and at least one memory including computer program code; the at least one memory and the computer program code being configured to, with the at least one processor, determine whether to allocate use of the radio system to the second SIM for a time period that occurs when the first SIM is in an active connected mode using the common radio system of the wireless device in order to be able to at least one of transmit data and receive data, and to allocate or deny use of the radio system to the second SIM accordingly.

According to a third aspect of the present invention, there is provided apparatus comprising: at least one processor; and at least one memory including computer program code; the at least one memory and the computer program code being configured to, with the at least one processor, cause a wireless device that includes the apparatus and that has at least a first SIM and a second SIM which share a common radio system of the wireless device at least to: determine whether to allocate use of the radio system to the second SIM for a time period that occurs when the first SIM is in an active connected mode using the common radio system of the wireless device in order to be able to at least one of transmit data and receive data; and to allocate or deny use of the radio system to the second SIM accordingly.

There is also provided a non-transitory computer-readable storage medium comprising a set of computer-readable instructions stored thereon, which, when executed by a processing system, cause the processing system to carry out a method as described above. The processing system may comprise at least one processor and at least one memory including computer program code.

Further features and advantages of the invention will become apparent from the following description of preferred embodiments of the invention, given by way of example only, which is made with reference to the accompanying drawings.

DETAILED DESCRIPTION

Again, for simplicity, reference will typically be made in the following description to a dual-SIM wireless device (which includes particularly mobile devices, including mobile phones (including so-called "smart phones"), personal digital assistants, tablet and laptop computers, etc.), which can hold or cater for two SIMs which share a single radio system. It will be understood however that these principles can be applied to a multi-SIM wireless device having more than two SIMs (and possibly more than one radio system), where at least two SIMs share a radio system.

Figure 1:
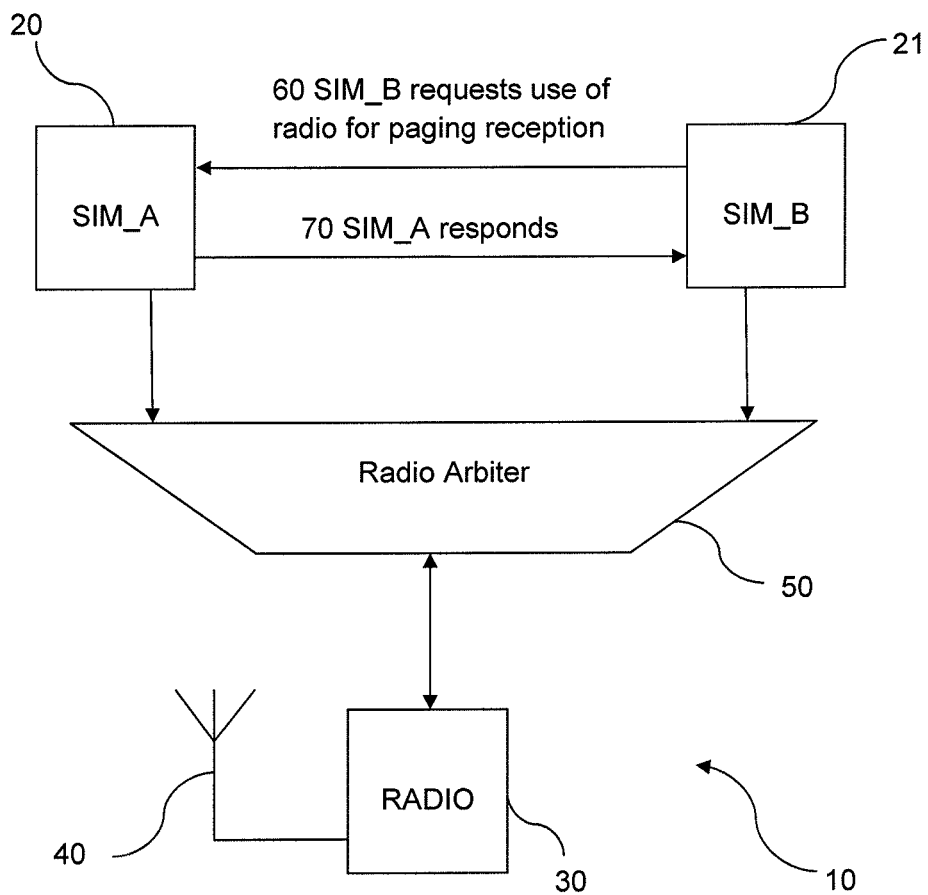
FIG. 1 shows schematically an example of a wireless device according to an embodiment of the present invention.

Referring to FIG. 1, a wireless device 10 has two SIMs 20,21, referred to herein as SIM_A and SIM_B respectively. The two SIMs 20,21 share a common radio front end 30 having one or more antennas 40. As noted above, a SIM has historically been implemented by a card, having an integrated circuit, etc., but this may be replaced with the SIM functionality being by software in the device (or indeed in other ways). Reference will be made in this specification generally to "SIM" to mean that part of a device that provides for the subscriber identity module functionality whether provided by a physical card, software in the device, or any other suitable arrangement. Moreover, a number of steps are discussed below as being made by a "SIM". It will be understood that this is to be interpreted where necessary as meaning steps being taken by a processor of the wireless device 10, whether that processor is a "main" processor of the wireless device 10 or some other processor in the wireless device 10, such as for example one associated with the particular SIM 20,21.

The following description is given principally in respect of a case when one SIM is in an ongoing packet switched (PS) packet data transfer mode, though the same techniques and principles apply where the SIM is in some other PS call or a circuit switched (CS) connection, such as a voice call, etc.

Moreover, in this specification, the SIM in an active data transfer may be referred to as the "active SIM" and the other SIM may be referred to as the "idle SIM". Where this document refers to the active SIM or the idle SIM, this typically refers to the protocol software and hardware that is running in the context of that SIM, and not necessarily the physical SIM itself (in the case of the SIM being in the form of a SIM card). Last, the specific examples discussed herein are principally in the context of Release 99 WCDMA (Wideband Code Division Multiple Access) calls in a dual SIM wireless device, in which in particular CELL-FACH (forward access channel) or CELL-DCH (dedicated channel) on UTRAN (Universal Mobile Telecommunications System Terrestrial Radio Access Network) are used for data connections. However, the teachings herein are also applicable to other radio access technologies, including by way of example GSM (Global System for Mobile Communications) and 3GPP LTE (3rd Generation Partnership Project Long Term Evolution), and to wireless devices having more than two SIMs.

In general terms, in the preferred embodiments discussed below, the idle SIM is able to request use of the radio system for short periods of time, such as to be able to receive paging, even though the other, active SIM may be allocated use of the radio system (whether or not it is actively transmitting or receiving at the time). In response, time gaps in the use of the radio system by the active SIM are scheduled to align with the time periods required by the idle SIM, such as for receiving paging. The active SIM may arrange its operations such that it can tolerate these gaps in transmission/reception. The scheduling of the time gaps is preferably sympathetic to the connected mode in use at the time. Also, in general, many radio protocols are inherently tolerant to short interruptions in the radio. In this way, it is for example possible for the idle SIM to receive indications of incoming calls and have the option to act on those calls. The time gaps are sometimes termed "autonomous" herein because the wireless device decides of its own accord when to schedule the paging gaps: this can be carried out independently of (i.e. without requiring agreement with or notifying) the mobile network to which the wireless device is connected.

Referring again to FIG. 1, an arrangement for arbitrating use of the radio front end 30 between the SIMs 20,21 is provided. This may be in the form of software or hardware or a combination of software and hardware, etc., and in general may be provided in or by any convenient part of the wireless device 10, such as in the main or another processor of the wireless device 10, including for example processors associated with the respective SIMs 20,21. This arrangement is shown schematically and generically as a radio arbiter 50 in the drawing. In addition, reference will some times be made in this specification to one or other of the SIMs 20,21 taking some action or making a decision, it being understood that this may in practice be by the so-called arbiter 50 or some other part of the wireless device 10. In broad terms, in the specific example, one SIM 21 requests 60 use of the radio 30 for paging reception and the other SIM 20 responds 70.

Figure 2:
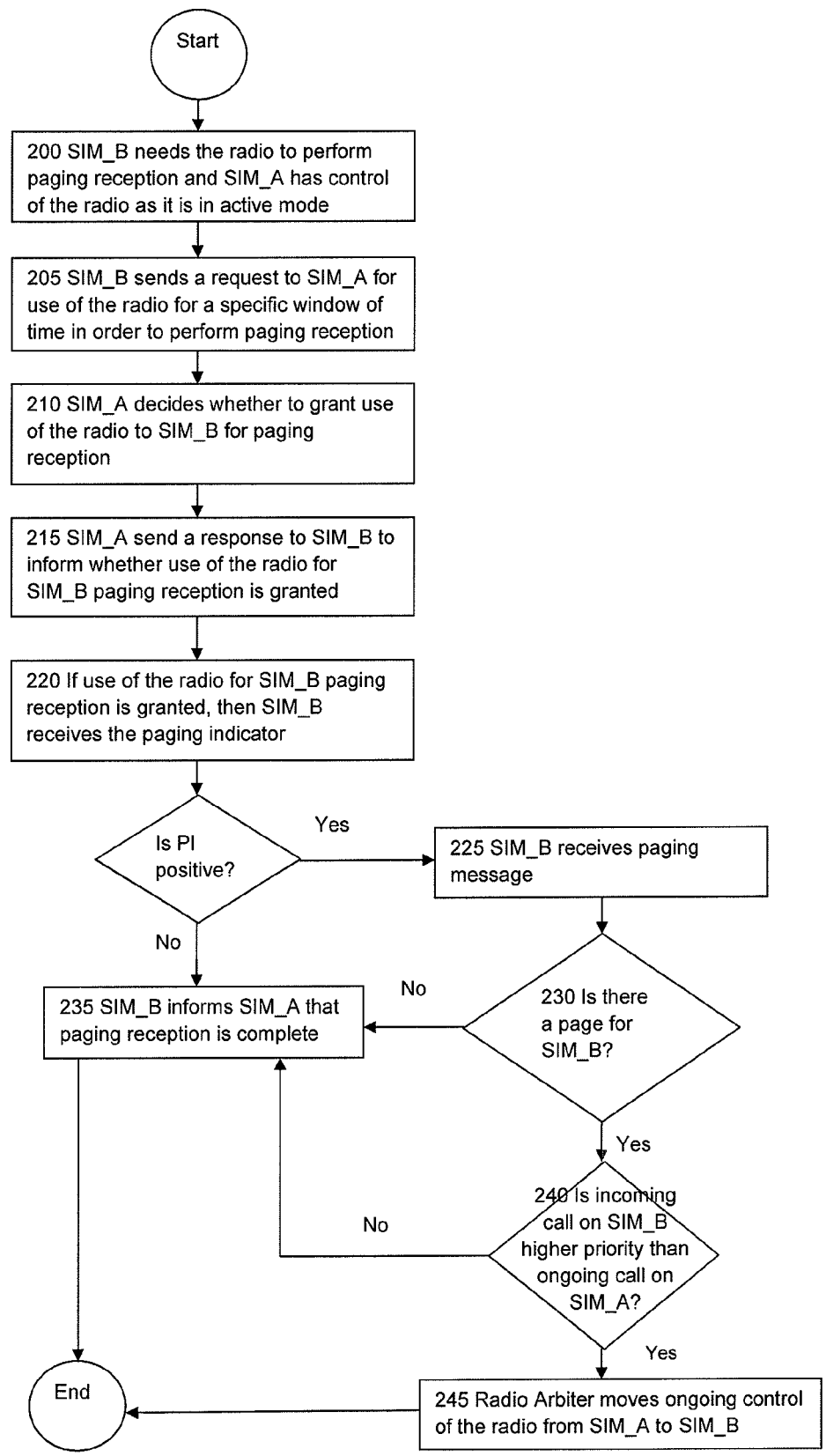
FIG. 2 shows schematically a flow diagram of an example of the interaction between two SIMs according to an embodiment of the present invention.

Referring now to FIG. 2, there is shown a flow diagram of an example of the interaction between SIM_A 20 and SIM_B 21. At 200, SIM_B 21 needs the radio 30 to perform paging reception (for example because SIM_B 21 is due a paging slot when it may receive a paging indicator or a paging message), but SIM_A 20 has control of the radio 30. At 205, SIM_B 21 therefore sends a message to SIM_A 20 in advance of the expected time of the paging reception, requesting use of the radio 30 for a specific window of time in which to perform paging reception. At 210, SIM_A 20 decides whether or not to grant use of the radio 30 to SIM_B 21 and at 215 sends a response to SIM_B 21 to inform it of this decision. At 220, if SIM_B 21 has been granted use of the radio 30, then it can go ahead and take control of the radio 30 in order to receive the paging indicator (PI). If the PI is positive, then at 225 SIM_B 21 also receives the paging message on the Paging Channel (PCH). At 230, if the paging message is not signalling a call for SIM_B 21, or if the PI is negative, then at 235 SIM_B 21 informs SIM_A 20 that paging reception is complete and SIM_A 20 can resume control of the radio 30 and continue data reception.

If at 230 a paging message is received and it indicates that there is a call for SIM_B 21, that typically indicates the paging purpose, e.g. if is for a PS or CS call. A decision can then be made as to what action to take. As noted above, this decision is indicated schematically and generically as being taken by the radio arbiter 50. If it is decided 240 that the incoming call on SIM_B 21 is higher priority than the ongoing call on SIM_A 20, then at 245 the radio arbiter 50 moves ongoing control of the radio 30 from SIM_A 20 to SIM_B 21 for data reception on SIM_B 21. If it is decided that the incoming call on SIM_B 21 is lower priority than the ongoing call on SIM_A 20, then at 235 SIM_B 21 will inform SIM_A 20 that paging reception is complete and SIM_A 20 will resume data reception using the radio 30.

A number of different criteria may be used to decide at 240 whether the incoming call on SIM_B 21 is higher priority than the ongoing call on SIM_A 20. Examples include:
(i) if the call on SIM_A 20 is a packet data connection and the incoming call on SIM_B 21 is a CS call, the CS call on SIM_B 21 is likely to be considered a higher priority (as it is likely to be a voice call, which is likely to be of more immediate interest to the user than a data connection on the other SIM);
(ii) if the call on SIM_A 20 is a packet data connection and the incoming call on SIM_B 21 is a packet data call, it could be considered that the already ongoing packet data connection on SIM_A 20 is higher priority. As an alternative, it could be that one SIM could always be considered the higher priority (i.e. be the "primary" SIM) in a case like this;
(iii) if the call on SIM_A 20 is a CS call and the incoming call on SIM_B 21 is a packet data connection, then the call on SIM_A 20 is likely to be considered a higher priority (as it is likely to be a voice call, which is likely to be of more immediate interest to the user than a data connection on the other SIM).

In general, for much of the time, it is only necessary to receive the PI, and only occasionally is it necessary also to receive the paging message. The allocation of the radio 30 for these two activities can therefore be handled in different ways. For example:
(i) SIM_B 21 could always request a window of time that is large enough to receive both the PI and the paging message, but only use a small part of this window in the case that PI is negative. SIM_B 21 signals to SIM_A 20 once it has completed PI reception so that SIM_A 20 can resume reception; or
(ii) SIM_B 21 requests a first window of time that is large enough only for the PI reception. If the PI is positive, SIM_B 21 requests a second window of time for the paging message.

When deciding whether or not to allocate the radio 30 to SIM_B 21 for paging reception (at step 210 above), there are a number of inputs that SIM_A 20 can consider. A schematic flow diagram for one example of this decision process is shown in FIG. 3.

Here, it is mentioned that there is already an existing functionality, controlled by the network (or, more precisely, some network control apparatus), to create gaps in the ongoing transmission/reception of a packet data connection with a wireless device. This falls into two main types:

(i) gaps created such that the radio can be used for some other purpose, including for example Compressed Mode (CM) gaps, FACH measurement occasions and Closed Subscriber Group (CSG) autonomous system information (SI) gaps. CSG autonomous SI gaps are gaps punctured in normal reception such that the wireless device can receive system information for mobility to HNB (home Node B)/CSG cells. These CSG autonomous SI gaps are autonomous with regard to their position in time, but are activated under network control; and (ii) gaps created such that the radio 30 can be switched off periodically, such as CPC (Continuous Packet Connectivity) and eDRx (Enhanced Discontinuous Reception).

Figure 3:
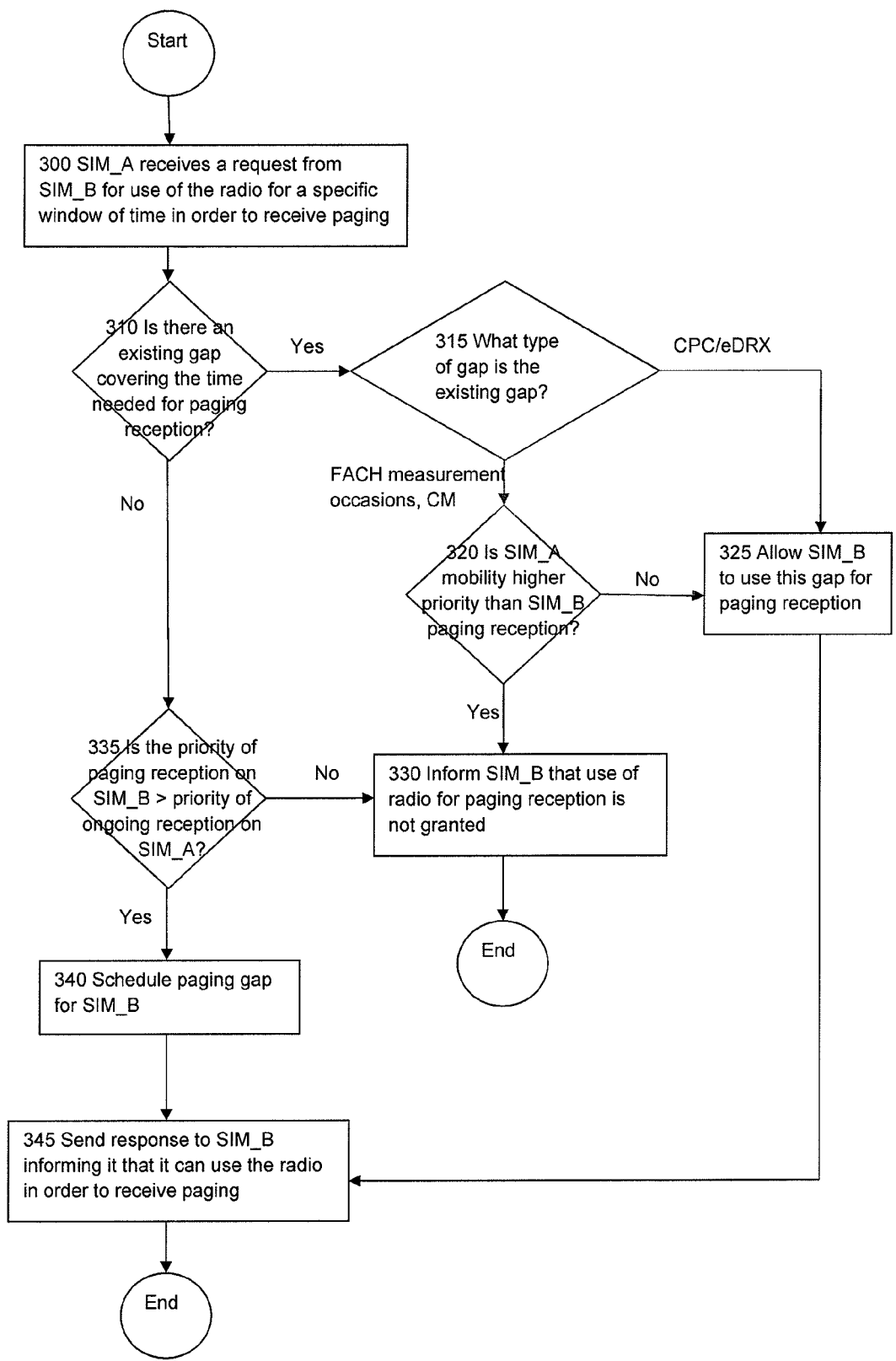
FIG. 3 shows schematically an example of a decision process for allocating a radio system between the two SIMs according to an embodiment of the present invention.

Thus, referring to FIG. 3, at 300, SIM_A 20 receives a request from SIM_B 21 for use of the radio 30 for a specific window of time in order to receive paging. At 310, it is determined whether there is an existing gap covering the time needed for the requested paging reception. If the time requested for paging reception is the same as the time of an existing gap, the type of that existing gap is noted at 315.

If the existing gap is of the first type (i) mentioned above, then some more logic is needed to decide whether or not to allocate the radio to SIM_B 21 for the requested paging reception. One example of how this logic can operate is shown in FIG. 3. For the case of a CM gap or FACH measurement occasions, it is decided at 320 whether or not mobility of SIM_A 20 (which is achieved through the use of CM gaps or FACH measurement occasions) is a higher priority than paging reception on SIM_B 21. If mobility of SIM_A 20 is a higher priority than paging reception for SIM_B 21, then SIM_B 21 is informed at 330 that use of the radio 30 for paging reception is not granted. (In such a case, SIM_B 21 may still receive the paging message at some later occasion as paging messages are typically repeated several times if necessary.) Otherwise, SIM_B 21 is allowed to use the gap for paging reception at 325.

If the time requested for paging reception is the same as the time of an existing gap and the existing gap is of the second type (ii) mentioned above (such as CPC or eDRX), then the decision is taken at 325 to allocate the radio 30 to SIM_B 21 for paging reception as SIM_A 20 is not doing anything in these gaps (and in this case paging reception on SIM_B 21 will typically be more important than the power saving provided by CPC or eDRx).

If SIM_B 21 is not able to make use of an existing gap in use of the radio 30 by SIM_A 20, then the wireless device 10 will have to decide whether or not to allocate a specific "new" paging gap. In such a case, at 335, a decision is made about whether paging reception on SIM_B 21 is more important than the ongoing reception on SIM_A 20. As one example only, it might be decided that paging reception on SIM_B 21 is more important than packet data reception on SIM_A 20 (since any lost packet data will be retransmitted), but not as important as CS data reception (as there is a risk that this could for example be audible on a voice call) on SIM_A 20. In any event, if paging reception on SIM_B 21 is less important than the ongoing reception on SIM_A 20, then SIM_B 21 is informed at 330 that use of the radio 30 for paging reception is not granted. Otherwise, if paging reception on SIM_B 21 is more important than the ongoing reception on SIM_A 20, then a specific "new" paging gap can be scheduled at 340 autonomously of the wireless network. In that case, SIM_A 20 cannot use the radio 30 during that time period, and use of the radio system is passed to SIM_B 21.

Either way, if a paging gap has been scheduled for use by SIM_B 21, whether that gap corresponds to an existing time gap or is a new time gap specifically set aside for the purpose, SIM_B 21 is informed at 345 that the radio can be used for receiving paging messages.

It is emphasised that these flow diagrams and the examples discussed above are just examples of the decision procedures. Other inputs and choices can be used. Moreover, in general, the above is somewhat of a simplification as in general it may also be necessary to consider the case when for example the window of time that is requested for paging reception only partially overlaps with an existing gap in the ongoing transmission/reception: suitable adjustments to the time periods and operation of the wireless device 10 and SIMs 20,21 may be required in such a case.

Figure 4:
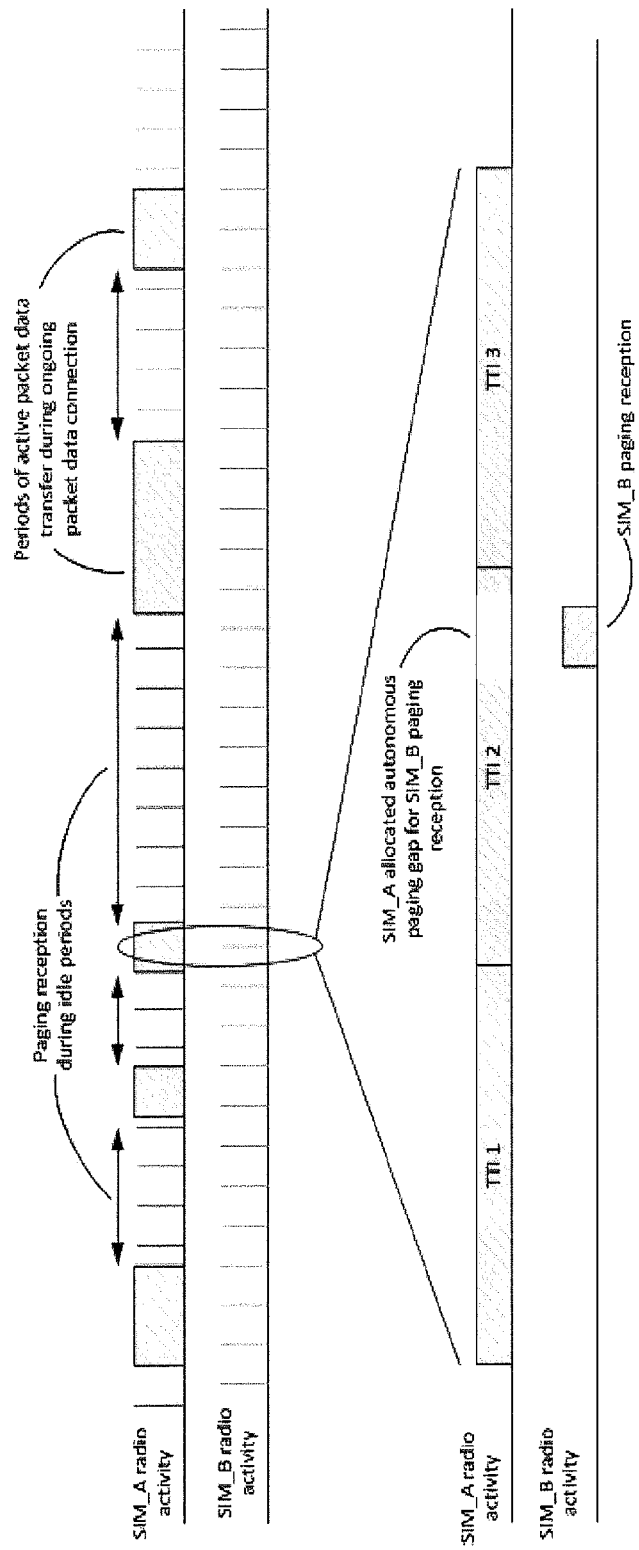
FIGS. 4 and 5 show timing diagrams for examples of embodiments of the present invention.

FIG. 4 shows a timing diagram for the case where SIM_A 20 allocates a new paging gap for SIM_B 21 to use the radio 30. The upper plots shows SIM_A 20 in an ongoing packet data connection with periods of active packet data transfer during which SIM_A 20 has control of the radio 30. In between, there are idle periods when SIM_A 20 is not using the radio 30 except for short periods to carry out paging reception for SIM_A 20. Paging reception for SIM_B 21 that occurs during the idle periods of SIM_A 20 can be received as long as it does not clash with paging reception for SIM_A 20. The lower plots in FIG. 4 show an exploded view of an example of paging reception for SIM_B 21 occurring during a period of active packet data transfer on SIM_A 20. In this case, a new gap is allocated autonomously for paging reception on SIM_B 21 and SIM_A 21 loses some data from TTI2 (Transmission Time Interval 2).

Figure 5:
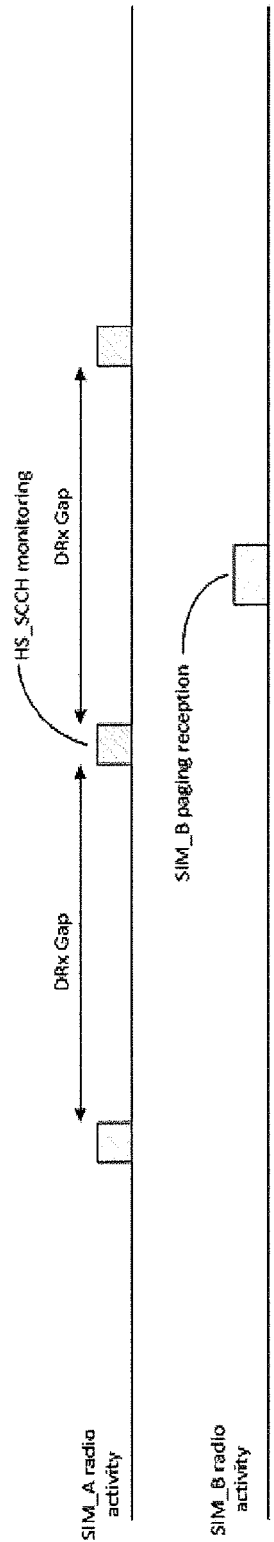

FIG. 5 shows a timing diagram for the case where the time needed for paging reception on SIM_B 21 coincides with a DRX gap of SIM_A 20, so SIM_B 21 can have control of the radio 30 for paging reception without any degradation in data reception for SIM_A 20.

Thus, embodiments of the present invention allow a dual SIM, single radio modem with one PS active SIM to receive calls on the other idle SIM, which has not previously been possible. In many cases, the SIM in connected mode will suffer no noticeable degradation in performance. In various examples, this is because:

(i) An existing gap in radio use (eg CPC, eDRx) can be used.
(ii) The transmission/reception gap for the PS active SIM is very short as the paging reception on the other SIM only needs a short time window, of approximately 3 ms say in some specific examples. Any lost data should be recoverable in DCH and FACH mode using normal error correction techniques, which typically operate over a TTI of 20 ms. As another example, in HSDPA, the lost data should be retransmitted using the HARQ processes which operate over a 24 ms window.
(iii) If the error correction or HARQ does not recover the data, then the data may be retransmitted by Layer 2 procedures in the wireless device.
(iv) The typical period between paging messages is 640 ms so the typical paging reception time (of around 3 ms) required by the other SIM is less than 1% of this, so the required interruptions (if any) to operation of the first SIM are relatively small.
(v) The packet data transfers on the first SIM are often not time critical, as they relate often to things such as an ongoing download of an email or a web page or the like.

As noted above, much of the above description is given principally in respect of a case when one SIM is in an ongoing packet switched (PS) packet data transfer mode. This invention can also be applied to allow the second idle SIM to receive calls in the case the first SIM is in a CS call. When a call is received on the second SIM, the wireless device can choose just to notify the user that they have missed a call. Alternatively, the wireless device could decide to accept the new call on the second SIM, or to give the user the option to accept the new call, in which case the ongoing call on the first SIM will be disconnected as necessary.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

The above embodiments are to be understood as illustrative examples of the invention. Further embodiments of the invention are envisaged. For example, whilst the specific examples discussed herein are principally in the context of Release 99 WCDMA calls in a dual SIM wireless device, in which in particular CELL-FACH or CELL-DCH on UTRAN are used for data connections, the teachings herein are also applicable to other radio access technologies, including by way of example GSM and 3GPP LTE, and to wireless devices having more than two SIMs and optionally more than one radio provided at least one radio is shared between at least two SIMs. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of operating a wireless device having at least a first subscriber identity module (SIM) and a second SIM which share a common radio system, the method comprising:

a first SIM of the wireless device being in an active connected mode using a common radio system of the wireless device in order to be able to at least one of transmit data and receive data;

determining whether to allocate use of the radio system to a second SIM of the wireless device for a time period; and at least one of:

allocating use of the radio system to the second SIM if the determination is that the first SIM is not scheduled to use the radio system to transmit or receive a signal while in the active connected mode during the time period;

allocating use of the radio system to the second SIM if the determination is that the first SIM is scheduled to use the radio system to transmit or receive a signal while in the active connected mode during the time period and it is further determined that use of the radio system by the second SIM is to be a higher priority than said scheduled use of the radio system by the first SIM; and interrupting use of the radio system by the first SIM while in the active connected mode, and allocating use of the radio system to the second SIM to transmit or receive a signal during the time period.

2. A method according to claim 1, wherein use of the radio system is allocated to the second SIM if it is determined that the first SIM is not scheduled, while in the active connected mode, to use the radio system to transmit or receive a signal during the time period.

3. A method according to claim 1, wherein use of the radio system is allocated to the second SIM if it is determined that the first SIM is scheduled, while in the active connected mode, to use the radio system to transmit or receive a signal during the time period and it is further determined that use of the radio system by the second SIM is to be a higher priority than said scheduled use of the radio system by the first SIM.

4. A method according to claim 1, wherein use of the radio system by the first SIM is interrupted to allow the second SIM to use the radio system to transmit or receive a signal during the time period.

5. A method according to claim 1, wherein said time period corresponds to a scheduled time of paging reception by the second SIM.

6. A method according to claim 5, wherein the second SIM is allocated use of the common radio system as said and receives a paging indicator during said time period, the second SIM continuing to use the common radio system if the paging indicator is positive, and the first SIM resuming use of the common radio system in the active connected mode if the paging indicator is negative.

7. A method according to claim 1, comprising the second SIM requesting use of the common radio system for the time period.

8. A wireless device, the wireless device comprising:

a common radio system arranged to be shared by a first subscriber identity module (SIM) and a second SIM of the device;

at least one processor; and at least one memory including computer program code; the at least one memory and the computer program code being configured to, with the at least one processor, determine whether to allocate use of the radio system to the second SIM for a time period that occurs when the first SIM is in an active connected mode using the common radio system of the wireless device in order to be able to at least one of transmit data and receive data, and to at least one of:

allocate use of the radio system to the second SIM if it is determined that the first SIM is not scheduled to use the radio system to transmit or receive a signal while in the active connected mode during the time period;

allocate use of the radio system to the second SIM if it is determined that the first SIM is scheduled to use the radio system to transmit or receive a signal while in the active connected mode during the time period and it is further determined that use of the radio system by the second SIM is to be a higher priority than said scheduled use of the radio system by the first SIM; and interrupt use of the radio system by the first SIM while in the active connected mode, and allocate use of the radio system to the second SIM to transmit or receive a signal during the time period.

9. The wireless device according to claim 8, wherein use of the radio system is allocated to the second SIM if it is determined that the first SIM is not scheduled, while in the active connected mode, to use the radio system to transmit or receive a signal during the time period.

10. The wireless device according to claim 8, wherein use of the radio system is allocated to the second SIM if it is determined that the first SIM is scheduled, while in the active connected mode, to use the radio system to transmit or receive a signal during the time period and it is further determined that use of the radio system by the second SIM is to be a higher priority than said scheduled use of the radio system by the first SIM.

11. The wireless device according to claim 8, wherein use of the radio system by the first SIM is interrupted to allow the second SIM to use the radio system to transmit or receive a signal during the time period.

12. The wireless device according to claim 8, wherein said time period corresponds to a scheduled time of paging reception by the second SIM.

13. The wireless device according to claim 12, wherein for the case in which use of the radio system is allocated as said to the second SIM while the first SIM is in the active connected mode:

the second SIM is constructed and arranged to continue to use the common radio system if the second SIM receives a paging indicator that is positive during said time period, and the first SIM is constructed and arranged to resume use of the common radio system if the second SIM receives a paging indicator that is negative during said time period.

14. An apparatus comprising:
at least one processor; and
at least one memory including computer program code;
the at least one memory and the computer program code being configured to, with the at least one processor, cause a wireless device that includes the apparatus and that has at least a first subscriber identity module (SIM) and a second SIM which share a common radio system of the wireless device at least to:
determine whether to allocate use of the radio system to the second SIM for a time period that occurs when the first SIM is in an active connected mode using the common radio system of the wireless device in order to be able to at least one of transmit data and receive data; and to at least one of:

allocate use of the radio system to the second SIM if it is determined that the first SIM is not scheduled to use the radio system to transmit or receive a signal while in the active connected mode during the time period;

allocate use of the radio system to the second SIM if it is determined that the first SIM is scheduled to use the radio system to transmit or receive a signal while in the active connected mode during the time period and it is further determined that use of the radio system by the second SIM is to be a higher priority than said scheduled use of the radio system by the first SIM; and interrupt use of the radio system by the first SIM while in the active connected mode, and allocate use of the radio system to the second SIM to transmit or receive a signal during the time period.

15. The apparatus according to claim 14, wherein use of the radio system is allocated to the second SIM if it is determined that the first SIM is not scheduled, while in the active connected mode, to use the radio system to transmit or receive a signal during the time period.

16. The apparatus according to claim 14, wherein use of the radio system is allocated to the second SIM if it is determined that the first SIM is scheduled, while in the active connected mode, to use the radio system to transmit or receive a signal during the time period and it is further determined that use of the radio system by the second SIM is to be a higher priority than said scheduled use of the radio system by the first SIM.

17. The apparatus according to claim 14, wherein use of the radio system by the first SIM is interrupted to allow the second SIM to use the radio system to transmit or receive a signal during the time period.

18. The apparatus according to claim 14, wherein said time period corresponds to a scheduled time of paging reception by the second SIM.

19. The apparatus according to claim 18, wherein the at least one memory and the computer program code are configured, with the at least one processor, such that for the case in which use of the radio system is allocated as said to the second SIM while the first SIM is in the active connected mode:

the second SIM continues to use the common radio system if the second SIM receives a paging indicator that is positive during said time period, and the first SIM resumes use of the common radio system if the second SIM receives a paging indicator that is negative during said time period.

20. A non-transitory computer-readable storage medium comprising a set of computer-readable instructions stored thereon, which, when executed by a processing system, cause the processing system to carry out the method according to claim 1.

* * * * *